(12) United States Patent
Marson

(10) Patent No.: US 6,651,277 B1
(45) Date of Patent: Nov. 25, 2003

(54) MULTIPLE CHAMBER SELF-INFLATABLE BODY

(75) Inventor: James E. Marson, Seattle, WA (US)

(73) Assignee: Cascade Designs, Inc., Seattle, WA (US)

(*) Notice: Subject to any disclaimer, the term of this patent is extended or adjusted under 35 U.S.C. 154(b) by 0 days.

(21) Appl. No.: 10/155,471

(22) Filed: May 24, 2002

(51) Int. Cl.$^7$ .............................................. A47C 27/15
(52) U.S. Cl. .................... 5/420; 5/737; 5/740; 5/709
(58) Field of Search ........................ 5/417, 420, 709, 5/737, 740, 691, 656, 700, 711, 413 AM

(56) References Cited

U.S. PATENT DOCUMENTS

| | | | |
|---|---|---|---|
| 4,039,363 A | | 8/1977 | Robertson |
| 4,371,997 A | * | 2/1983 | Mattson ........................ 5/709 |
| 4,601,076 A | * | 7/1986 | Knobeloch .................. 5/413 R |
| 5,203,041 A | * | 4/1993 | Alonso ........................... 5/420 |
| 5,329,656 A | | 7/1994 | Leggett |
| 5,720,057 A | * | 2/1998 | Duncan ......................... 5/420 |
| 6,065,164 A | * | 5/2000 | Swanger et al. ............... 5/420 |
| 6,108,835 A | * | 8/2000 | Hwang ........................... 5/420 |
| 6,397,417 B1 | * | 6/2002 | Switlik ........................... 5/709 |
| 6,446,289 B1 | * | 9/2002 | Su et al. ......................... 5/709 |

OTHER PUBLICATIONS

"Backpacker Magazine" Feb. 2002.

* cited by examiner

Primary Examiner—Michael F. Trettel
(74) Attorney, Agent, or Firm—Graybeal Jackson Haley LLP

(57) ABSTRACT

A multiple chamber self-inflating pad having a fluid impervious first chamber defined by a first flexible panel and an intermediate panel in which a first resilient member is disposed and to which the resilient member is bonded. An orifice is provided to control inflation or deflation of the first chamber. A second flexible panel is selectively bonded to the intermediate flexible panel preferably to form a gap or pocket into which a second resilient member may be removably disposed. Preferably, the first resilient member is an open cell foam while the second is constructed from closed cell foam. Alternative embodiments include the creation of a fluid impervious second chamber either fluidly linked to the first chamber or to the environment, alternative resilient materials, inclusion of radiant barriers, and the like.

31 Claims, 3 Drawing Sheets

MULTIPLE CHAMBER SELF-INFLATABLE BODY

BACKGROUND

Self-inflating cushions or pads are well known. A leader in this field is Cascade Designs, Inc., maker of the THERM-A-REST® brand self-inflating mattress pad as well as numerous others based upon the same or similar technology. This technology uses a slab of open cell foam bonded between two flexible sheets of material that are in turn bonded to each other at the perimeter of the slab. The result of this construction yields a fluid impervious enclosure wherein the slab acts as a tensile element to resist uncontrolled shape deformation of the enclosure. In other words, the enclosure retains the shape of the slab when the enclosure is pressurized above atmospheric pressure since the bonded foam resists the tendency of the sheets to go non-planar.

Occasionally during use, such pads are punctured, which results in the loss of air in and collapse of the enclosure. Because the open cell foam is selected for its appropriateness as a tensile element, it does not perform well when in compression. As a consequence, the pad will fail to perform as intended until the enclosure is again sealed from the environment.

In the field of outdoor recreation, the environment in which an enthusiast will use a self-inflating pad varies widely from season to season, and even during a season. As is well known by people serious about outdoor adventure, weight is of high concern. Thus, having sufficient protection from the environment without having unnecessary weight is considered an advantage.

SUMMARY OF THE INVENTION

The invention is directed to a multiple chamber inflatable body that combines both a self-inflating chamber or compartment and a second chamber or compartment. The second chamber may be constructed to removably receive a resilient member, to permanently retain a resilient member, or to exhibit self-inflating properties. By this invention in its various embodiments, benefits inherent in a self-inflating style ground pad and a conventional self-supporting pad can be attained.

All embodiments of the invention comprise a first chamber defined by a first outer flexible panel having an outer surface, an inner surface and a periphery superposed upon an intermediate flexible panel having a first or upper surface, a second or lower surface and a periphery. A common portion to the first outer flexible panel is substantially secured to the intermediate flexible panel to thereby create the first chamber. This first chamber is preferably fluid impervious so that gas (included in the definition of "fluid") once in the chamber cannot escape without user intervention.

A resilient member is preferably disposed in the first chamber, although any member having extension counter-acting properties (tensile properties) as well as compressibility properties is sufficient. This first resilient member is preferably bonded to the inner surface of the first outer flexible panel and the first surface of the intermediate flexible panel so as to act as a tensile member when the chamber has positive pressure. To the extent possible, it is also preferable to bond the perimeter of the first resilient member to either panel. This form of a self-inflatable body is found in U.S. Pat. Nos. 4,624,877, 5,282,586, 5,552,205 and 5,705,252, the disclosures of which are incorporated herein by reference.

In various embodiments, the first chamber is formed by substantially securing the first outer flexible panel to the intermediate flexible panel, however, the first panel and/or the intermediate panel is/are modified to include at least one orifice through which fluid may ingress and egress without user intervention or control. The orifice may be located in either panel, or at the bonded interface between the first panel and the intermediate panel.

By incorporating a user operable valve at the orifice that is in fluid communication with the first chamber and the environment, a user can control the state of the first chamber. Thus, when the valve is opened, air from the environment is drawn into the first chamber by the partial vacuum created by the expanding foam until equilibrium is reached, whereafter the valve is closed. When the valve is again opened and the first chamber compressed, air is expelled until the valve is again closed, whereafter the compressed state of the first chamber is maintained.

In addition to the presence of a first chamber, the invention also includes a second chamber as previously mentioned. The second chamber is defined by a second outer flexible panel having an outer surface, an inner surface and a periphery superposed upon the intermediate flexible panel. A common portion to the second outer flexible panel is selectively secured to the intermediate flexible panel to thereby create the second chamber.

A feature of the second chamber of a preferred embodiment is the lack of an overall fluid imperious structure. Preferably, the second chamber has unsecured a sufficient portion of its perimeter as defined by the common periphery of the second and intermediate panels so as to removably receive a second resilient member. One or more closure elements may be provided to prevent the unintentional dislocation of the second resilient member from the second chamber. In alternative embodiments, a non-removable resilient member (unbonded) as well as a bonded resilient member are employed, and are considered within the scope of the invention.

Contrary to the preceding paragraph, yet another alternative embodiment calls for the incorporation of a fluid impermeable second chamber. Here, the second chamber and second resilient member combination is created according to that of the first chamber and resilient member combination, resulting in a fluid impermeable chamber. Similarly, the second resilient member is preferably substantially bonded to the inner surfaces of the second chamber and a valve is preferably present to regulate the chamber volume. The valve may couple the second chamber to the environment or to the first chamber.

In any of the previously described embodiments, the nature of the resilient members can be varied. While best results for the first chamber pad have been achieved using open cell foam pads, alternatives include fibrous batting Similarly, while best results for the second chamber pad have been achieved using closed cell foam resilient members, alternatives include non-cellular film sheets, thermoformed camping mats, and insulating panels or rigid insulating slats.

In any of the previously described embodiments, the nature of the flexible panels and the methods for bonding the resilient member to the panels can be varied. In one embodiment, the first panel is constructed from polyester fabric that is coated on at least one side with a thermoplastic such as polyurethane, as is the upper surface of the intermediate panel. If the second resilient member of the second chamber is also be bonded, then at least one surface of the second panel is coated with a thermoplastic such as thermoplastic polyurethane, as is the lower surface of the intermediate panel. Textiles are not necessary to execute the present invention. Laminates of polyurethane films or other polymeric films may also be used for one or more of the panels. In other embodiments, one or more layers of a radiant thermal barrier are incorporated into one or more panels. These layers include aluminized skins such as Mylar, or insulating vacuum panels.

DETAILED DESCRIPTION OF THE INVENTION

Figure 1:
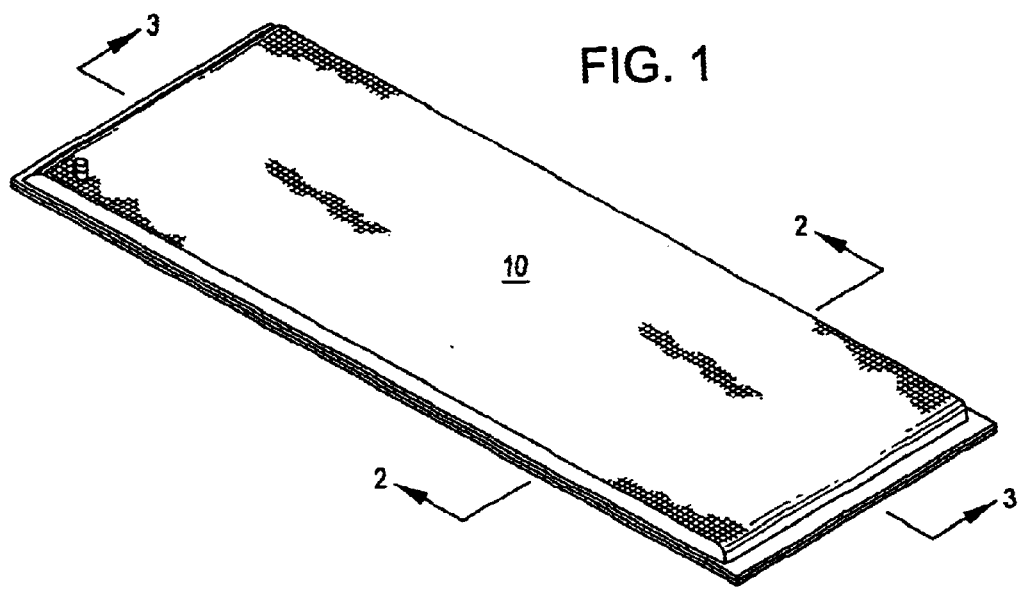
FIG. 1 is a perspective view of a preferred embodiment of the invention.
Figure 2:
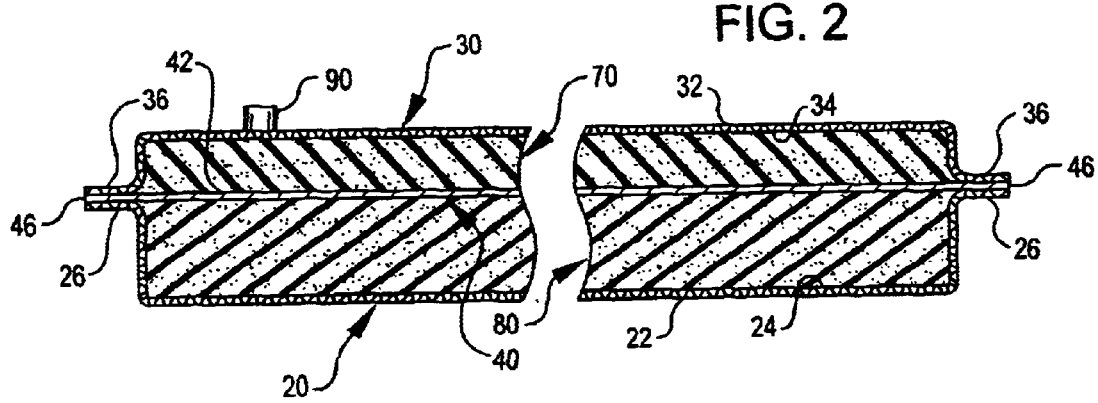
FIG. 2 is a cross sectional elevation taken substantially along the line 2—2 in FIG. 1 illustrating the nature and placement of the several pads disposed in the several chambers.

Turning then to the several drawings wherein like numerals indicate like parts, and more particularly to FIGS. 1–3 and 5, the general attributes and construction of combination pad 10 are shown. Pad 10 comprises bottom panel 20, top panel 30, and intermediate panel 40, which are selectively attached to one another in order to form two chambers. One chamber is preferably a fluid impervious chamber sealed from the external environment and includes self expanding and maintaining features, while the other chamber is intended to selectively receive a removable resilient member.

Again returning to the referenced figures, bottom panel 20 includes outside surface 22, inside surface 24, and periphery 26. Similarly, top panel 30 includes outside surface 32, inside surface 34, and periphery 36. Finally, intermediate panel 40 includes upper surface 42, lower surface 44, and periphery 46. Shown disposed in first or upper chamber 50 is resilient member 70; shown disposed in second or lower chamber 60 is resilient member 80.

Resilient member 70 is preferably an open cell foam slab of polyurethane entirely bonded to inside surface 34 of top panel 30 and upper surface 42 of intermediate panel 40. The aforementioned bonding may be by any conventional means and preferably includes those methods and constructions identified in commonly owned U.S. Pat. No. 4,624,877, as well as adhesive bonding and the like. The purpose of such construction is to create an inflatable body similar to that employed by the above referenced patent, which is incorporated herein by reference. Alternative resilient members include fiber batting. Moreover, a cellular approach can be used so long as the overall structure is capable of compression and acts as a tensile element when pad 10 is in an inflated state.

Resilient member 80 is preferably a closed cell foam slab of polyolefin, which is selected to provide compressional support to pad 10, and to physically and thermally insulate chamber 50. Alternative resilient members include non-cellular film or sheets, thermoformed camping mats, non-woven or woven textile mats with either puncture resistance and/or insulating capabilities or rigid insulating panels or slats.

To modulate air ingress and egress from chamber 50, valve 90 is provided. Valve 90 is a conventional two-way conduit with a screw top cap to close the conduit. While shown located in top panel 30, an alternative preferable location is at the seam or periphery between top panel 30 and intermediate panel 40. Although valve 90 represents a convenient means for modulating air flow, alternative structures include, but are not limited to, one- and two-way valves, and one or more holes that may have a pre-established burst pressure.

Figure 3:
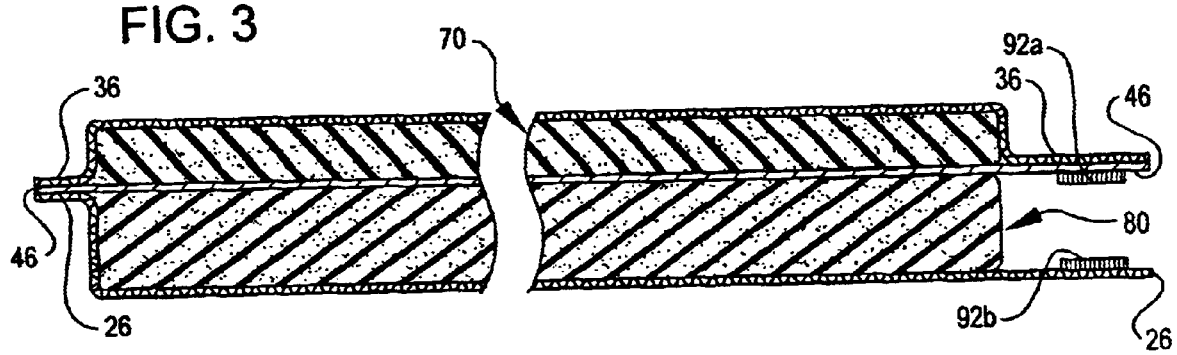
FIG. 3 is a cross sectional elevation taken substantially along the line 3—3 in FIG. 1 illustrating the nature and placement of the several pads disposed in the several chambers as well as an opening for receiving and extracting a removable pad.
Figure 4:
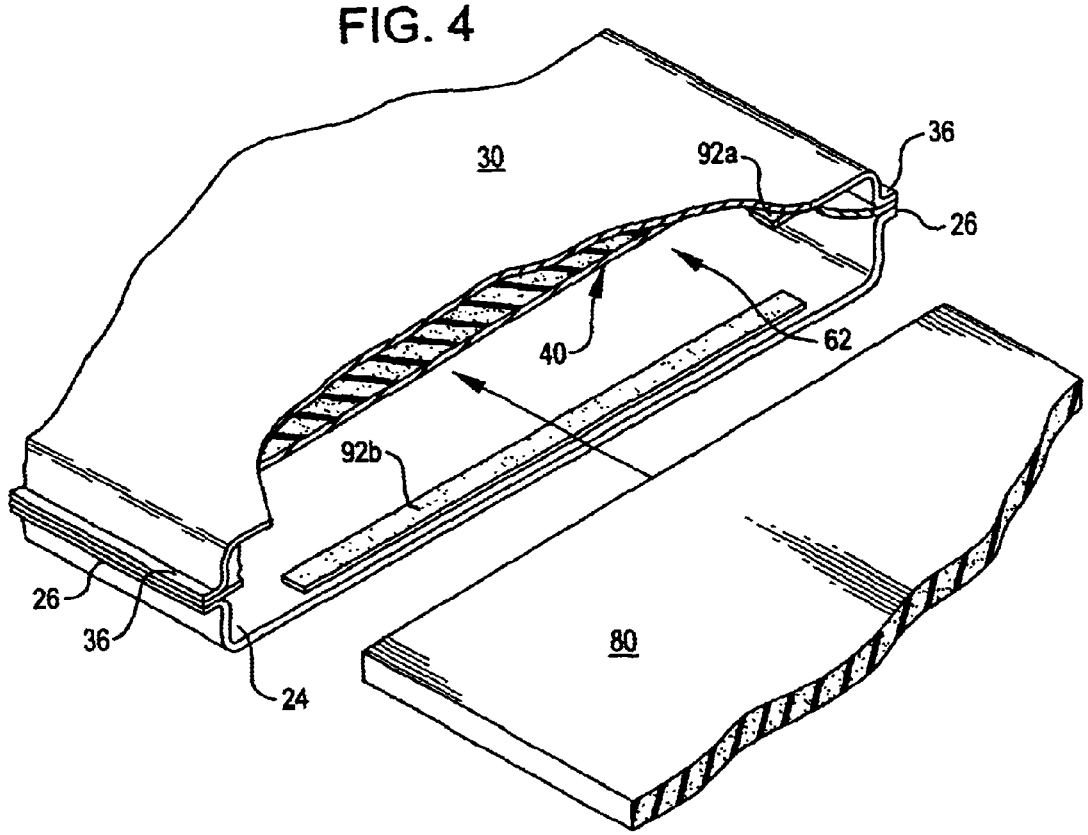
FIG. 4 is a partial cut away perspective view of a preferred embodiment showing the insertion of the removable pad into a second chamber.
Figure 5:
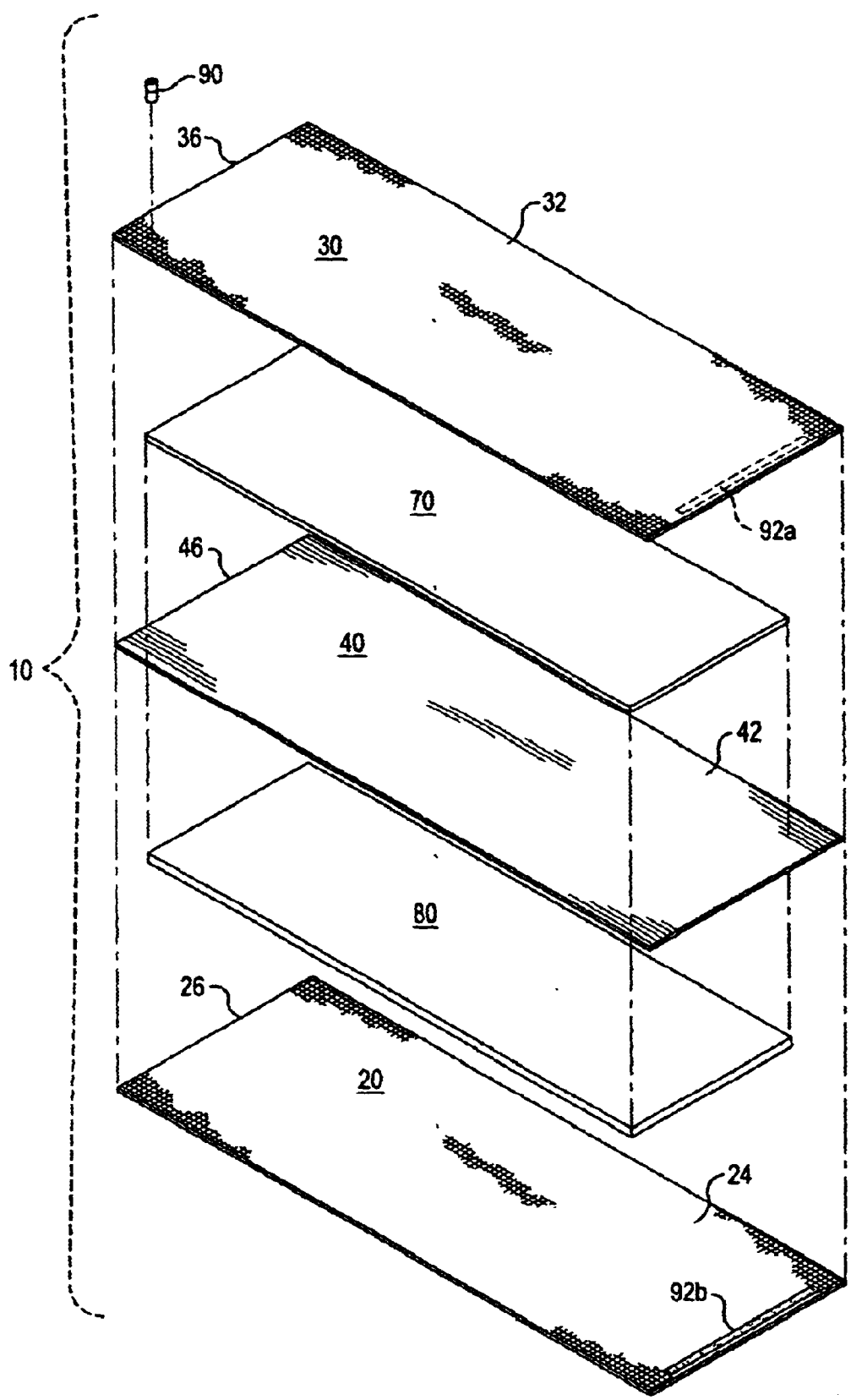
FIG. 5 is an exploded perspective view of a preferred embodiment showing the superposed nature of the panels and pads used in constructing the embodiment.

Pad 10 also includes lower chamber 60 as defined by intermediate panel 40 and bottom panel 20. As best shown in FIGS. 3 and 4, lower chamber 60 is preferably not sealed from the environment. To the contrary, this chamber is formed to include opening or gap 82 so as to receive one or more insertable resilient elements 80, which operate to vary the overall characteristics of pad 10. Unlike wholly bonded resilient member 70 of upper chamber 50, resilient member 80 is preferably not bonded to inside surface 24 bottom panel 20 nor to lower surface 44 of intermediate panel 40 in this embodiment.

Because of the removable nature of resilient member 80 from lower chamber 60, means for temporarily enclosing lower chamber 60 are provided through the use of closure elements 92. These closure elements are located along opening 82 to provide mechanical interference from the unintentional dislodgment of resilient member 80 via opening 82. While closure elements 92 (in the form of two-part hook and loop fasteners) are presently illustrated, those persons skilled in the art will appreciate the use of a myriad of other closure elements that include, but are not limited to, generic two part fastening systems, linear closure elements, slide fasteners, and snap fasteners.

A feature of the invention is its flexibility in design and use. In the described embodiment, a user of the pad can remove resilient member 80, for example, to save weight and/or use during warm conditions. A user may also have one or more varieties of resilient member 80 useful for various applications. Thus, lower chamber 60 in the illustrated embodiment is preferably of sufficient dimension and volume so as to accept resilient members of varying thickness, and/or combinations.

In alternative embodiments, lower chamber 60 may be sealed (either in an isolated form or in conjunction with upper chamber 50). In one such embodiment, lower chamber 60 is fluidly coupled to upper chamber 50, either by one or more direct conduits (such as an orifice) or by valving. Such an embodiment may be beneficial for very thick resilient member applications where a single slab of open cell foam may not be suitable. In this manner, two less thick foam slabs are bound by a single enveloping structure wherein intermediate panel 40 acts as a mechanical linkage between the two slabs. Alternatively, lower chamber 60 functions as an isolated chamber with its own valve or orifice(s) to the environment. In any of these embodiments, the resilient member may be bonded or captive and unbonded.

Generally, any resilient member 80 will remain in chamber 60 during use and storage. Because pad 10 is preferably stored in a rolled up state, highly compressible resilient member 70 is subject to more compression during rolling than resilient member 80 (the rolled radius of member 70 is less than the rolled radius of member 80 for any given segment). This arrangement permits a desirable tight roll for short term storage (if a less compressible material such as closed cell foam were use for resilient member 70, the smaller radius impressed upon it would cause wrinkling and buckling given the limited ability of the member to compress).

What is claimed:

1. A multiple chamber inflatable body comprising:
   a first chamber defined by a first outer flexible panel having an outer surface, an inner surface and a periphery superposed upon an intermediate flexible panel having a first surface, a second surface and a periphery wherein a common portion of the first outer flexible panel is secured to the intermediate flexible panel;
   a first resilient member located in the first chamber wherein the first resilient member has first and second major surfaces; and
   a second chamber defined by a second outer flexible panel having an outer surface, an inner surface and a periphery superposed upon the intermediate flexible panel wherein a common portion of the second outer flexible panel is selectively secured to the intermediate flexible panel to form a gap between the second chamber and the environment to receive a second resilient member.

2. The inflatable body of claim 1 wherein the first resilient member is at least partially bonded on its first major surface to the inner surface of the first outer flexible panel and on its second major surface to the first surface of the intermediate panel.

3. The inflatable body of claim 1 wherein the first resilient remember is wholly bonded on its first major surface to the inner surface of the first outer flexible panel and on its second major surface to the first surface of the intermediate panel.

4. The inflatable body of claim 1 wherein the first chamber is sealed from the environment about the common portion, and further comprising at least one orifice between the first chamber and the environment to permit fluid flow to and from the first chamber.

5. The inflatable body of claim 4 wherein the orifice is selected from the group consisting of a one-way valve, a two-way valve, a hole defined by the first panel, a hole defined by the intermediate panel, a hole defined by the periphery of the first panel and the periphery of the intermediate panel, and a valve means for permitting fluid flow to and from the first chamber.

6. The inflatable body of claim 1 wherein the selective securement of the second flexible panel to the intermediate flexible panel occurs at the common periphery so that the second chamber forms a pocket.

7. The inflatable body of claim 1 further comprising a second resilient member located in the second chamber wherein the second resilient member has first and second major surfaces.

8. The inflatable body of claim 7 wherein the second resilient member is at least partially bonded on its first major surface to the inner surface of the second outer flexible panel and on its second major surface to the second surface of the intermediate panel.

9. The inflatable body of claim 7 wherein the second resilient member is wholly bonded on its first major surface to the inner surface of the second outer flexible panel and on its second major surface to the second surface of the intermediate panel.

10. The inflatable body of claim 8 wherein the second chamber is sealed from the environment about the common portion.

11. The inflatable body of claim 10 further comprising at least one fluid conduit between the first and second chambers.

12. The inflatable body of claim 10 further comprising at least one orifice between the second chamber and the environment to permit fluid flow to and from the second chamber.

13. The inflatable body of claim 12 wherein the orifice is selected from the group consisting of a one-way valve, a two-way valve, a hole defined by the second panel, a hole defined by the intermediate panel, a hole defined by the periphery of the second panel and the periphery of the intermediate panel, and a valve means for permitting fluid flow to and from the second chamber.

14. The inflatable body of claim 10 wherein the second resilient member is at least partially bonded on its first major surface to the inner surface of the second outer flexible panel and on its second major surface to the second surface of the intermediate panel.

15. The inflatable body of claim 10 wherein the second resilient member is wholly bonded on its first major surface to the inner surface of the second outer flexible panel and on its second major surface to the second surface of the intermediate panel.

16. The inflatable body of claim 1 wherein at least one panel comprises a thermal reflective component.

17. The inflatable body of claim 6 further comprising at least one two part closure element located at the common periphery to provide mechanical interference between the pocket and the environment.

18. The inflatable body of claim 1 wherein the first resilient member is selected from the group consisting of an open cell foam and a fibrous batting.

19. The inflatable body of claim 7 wherein the second resilient member is selected from the group consisting of a closed cell foam, non-cellular film, thermoformed foam, at least one woven textile mats, at least one non-woven textile mats, and at least one insulating panels.

20. The inflatable body of claim 7 wherein the first resilient member has a density less than the density of the second resilient member.

21. A method for constructing a multiple chamber self-inflating body comprising:
    superposing an intermediate flexible panel having a first surface, a second surface and a periphery over a) a first outer flexible panel having an outer surface, an inner surface and a periphery, and b) a first resilient member wherein the first resilient member is disposed between the first outer flexible panel and the intermediate flexible panel;
    bonding at least a part of a first resilient member to the inner surface of the first flexible panel and at least a second part of the resilient member to the upper surface of the intermediate flexible panel;
    sealingly securing the first outer flexible panel to the intermediate flexible panel to thereby form a fluid impervious first chamber;
    providing a fluid conduit between the first chamber and the environment;
    superposing a second outer flexible panel having an outer surface, an inner surface and a periphery on the intermediate flexible panel; and
    selectively securing the second outer flexible panel to the intermediate flexible panel to thereby form a second chamber.

22. The method of claim 21 further comprising inserting a second resilient member between the intermediate flexible panel and the second outer flexible panel; and bonding at least a part of the second resilient member to the intermediate flexible panel and the second outer flexible panel, wherein the selective securing of the second outer flexible panel creates a sealed second chamber.

23. The method of claim 22 further comprising establishing a fluid conduit between the first and second chambers.

24. The method of claim 23 further comprising establishing a fluid conduit between the second chamber and the environment.

25. The method of claim 22 further comprising establishing a fluid conduit between the second chamber and the environment.

26. The method of claim 21 further comprising establishing a fluid conduit between the first chamber and the environment.

27. The method of claim 21 wherein the selective securement causes the second chamber to approximate a pocket and further comprising providing a removable physical barrier between the second chamber and the environment.

28. The method of claim 21 wherein the selective securement causes the second chamber to approximate a pocket and further comprising providing a second resilient member sized to fit within the second chamber.

29. The method of claim 28 wherein the first resilient member has a density less than the second resilient member.

30. The method of claim 21 further comprising providing a radiant thermal barrier.

31. A multiple chambered inflatable system comprising:

A fluid impervious first chamber defined by a first outer flexible panel having an outer surface, an inner surface and a periphery superposed upon an intermediate flexible panel having a first surface, a second surface and a periphery wherein a common portion of the first outer flexible panel is secured to the intermediate flexible panel;

a first resilient member located in the first chamber wherein the first resilient member has first and second major surfaces substantially bonded to the outer flexible panel inner surface and the intermediate flexible panel first surface, respectively;

at least one orifice to selectively expose the first chamber to the environment;

a second chamber defined by a second outer flexible panel having an outer surface, an inner surface and a periphery superposed upon the intermediate flexible panel wherein a common portion of the second outer flexible panel is selectively secured to the intermediate flexible panel thereby forming a gap between the second flexible panel periphery and the intermediate panel periphery so that the second chamber forms a pocket; and a second resilient member locatable in the second chamber.

* * * * *

UNITED STATES PATENT AND TRADEMARK OFFICE
CERTIFICATE OF CORRECTION

PATENT NO.    : 6,651,277 B1
DATED         : November 25, 2003
INVENTOR(S)   : Marson It is certified that error appears in the above-identified patent and that said Letters Patent is hereby corrected as shown below:

Column 6,
Line 37, "mats" should be -- mat --.
Line 38, "mats" should be -- mat -- and "panels" should be -- panel --.

Signed and Sealed this

Seventeenth Day of August, 2004

JON W. DUDAS
*Acting Director of the United States Patent and Trademark Office*